(12) United States Patent
Steffen

(10) Patent No.: US 6,530,359 B1
(45) Date of Patent: Mar. 11, 2003

(54) GENERATING UNIT WITH ENGINE SPEED CONTROL DEVICE

(75) Inventor: Michael Steffen, Stockdorf (DE)

(73) Assignee: Wacker Construction Equipment AG, Munich (DE)

( * ) Notice: Subject to any disclaimer, the term of this patent is extended or adjusted under 35 U.S.C. 154(b) by 0 days.

(21) Appl. No.: 09/763,910
(22) PCT Filed: Aug. 10, 1999
(86) PCT No.: PCT/EP99/05839
§ 371 (c)(1),
(2), (4) Date: Feb. 26, 2001
(87) PCT Pub. No.: WO00/14865
PCT Pub. Date: Mar. 16, 2000

(30) Foreign Application Priority Data

Sep. 4, 1998 (DE) .......................................... 198 40 454

(51) Int. Cl.[7] ................................................ F02P 9/00
(52) U.S. Cl. ....................................... 123/335; 701/112
(58) Field of Search ............................ 123/335, 339.18; 701/112

(56) References Cited

U.S. PATENT DOCUMENTS 5,769,051 A * 6/1998 Bayron et al. ............... 123/335
6,009,371 A * 12/1999 Kobayashi ................... 701/112

FOREIGN PATENT DOCUMENTS

DE          4311670        10/1994
EP          0 352 759       7/1989

* cited by examiner

*Primary Examiner*—Gene Mancene
*Assistant Examiner*—Johnny H. Hoang
(74) *Attorney, Agent, or Firm*—Boyle Fredrickson Newholm Stein & Gratz S.C.

(57) ABSTRACT

The invention relates to a generating unit driven by a combustion engine. Control of the engine speed is carried out in a known manner via a mechanical control device which controls a throttle valve in the carburetor system of the engine. In case of a failure of the mechanical control device and, consequently, in case of a change in the engine speed outside a predetermined range, an electronic control system takes over to activate a firing element of the engine and control the engine speed, independently from the mechanical control system, in such a way that the engine speed is maintained within the predetermined range.

14 Claims, 1 Drawing Sheet

GENERATING UNIT WITH ENGINE SPEED CONTROL DEVICE

BACKGROUND OF THE INVENTION

1. Field of the Invention

This invention pertains to a power-generating system.

2. Description of the Related Art

Mobile power-generating systems or producers usually consist of a generator that is driven by an internal combustion engine. Commonly used as the generator are synchronous or asynchronous generators whose output voltage at the generator depends on the rotor RPM, i.e. on the engine RPM. If the engine RPM's increase, the output voltage also increases, which in worst cases can lead to the destruction of the users connected to the power producer.

To this end, internal combustion engines of known power-generating systems have a mechanical control system that maintains the engine RPM at a predetermined value within its operating range. It is possible for the control action to be affected in such a way that the engine RPM can no longer be kept within the prescribed range, especially when the mechanical controller is disrupted, for example by control rods being blocked, broken springs, seized bearings or similar causes.

For expensive, technically complicated power generators—such as are known from DE 196 38 357 A1, for example—another voltage control system is connected in series in addition to the RPM control system, and this additional voltage control system monitors the voltage produced by the generator and changes it by a suitable control means, such as through a rotor field control system or by changing the excitation. However, the voltage control system has no effect on the engine RPM. As a result, although the voltage can be held at a preset value, the generator voltage frequency continues to depend on the engine RPM.

DE 43 11 670 A1 describes a known circuit arrangement for a voltage controller located at a generator output with which the field current keying ratio can be detected at the generator. If the field current keying ratio is at a high level, i.e. if there is a large power draw by the users connected to the generator, this information can be detected directly by the circuit and processed, resulting in the RPM of an internal combustion engine that drives the generator being raised somewhat in order to satisfy the higher power draw at the generator.

From EP-A-0 352 759, a system to control actuating devices of an automobile is known having a safety concept characterized by the monitoring of equal elements of the individual functional chains as well as by the initiation of emergency measures if an error in one of the elements is detected during monitoring. The desired emergency measure is to either retain the current functional state or to change it in a direction that increases the safety level.

OBJECTS AND SUMMARY OF THE INVENTION

The objective of this invention is to provide a power-generating system that can prevent the above problems with respect to excess voltage increases at increased engine RPM and with respect to increased voltage frequency.

A power-generating system according to the invention an internal combustion engine, a generator driven by the internal combustion engine, a mechanical control unit to control a RPM of the internal combustion engine, a RPM-determining unit, and an electronic control unit coupled to the RPM-determining unit to control the RPM of the internal combustion engine, wherein the electronic control unit only controls the RPM, thus overriding an effect of the mechanical control unit, when the RPM-determining unit detects a RPM outside of a prescribed operating range.

According to the invention, an electronic RPM control system is superimposed or connected in series to the known mechanical engine RPM control system. If, due to a disruption of the mechanical controller, the engine RPM leaves the preset control range of the mechanical controller, in particular if it exceeds it, the electronic controller that was inactive up until then activates and influences the RPM of the engine—preferably by means of its ignition. Influencing the ignition can be done by interrupting it or by leaving out individual sparks. Also, the ignition timing can be changed.

BRIEF DESCRIPTION OF THE DRAWINGS

Due to the effect of the electronic RPM control system connected in series, the RPM of the engine and thus of the generator stays within the prescribed RPM range. The output voltage at the generator also lies within the prescribed range accordingly with regard to its voltage level and frequency.

DETAILED DESCRIPTION OF THE PREFERRED EMBODIMENTS

Figure 1:
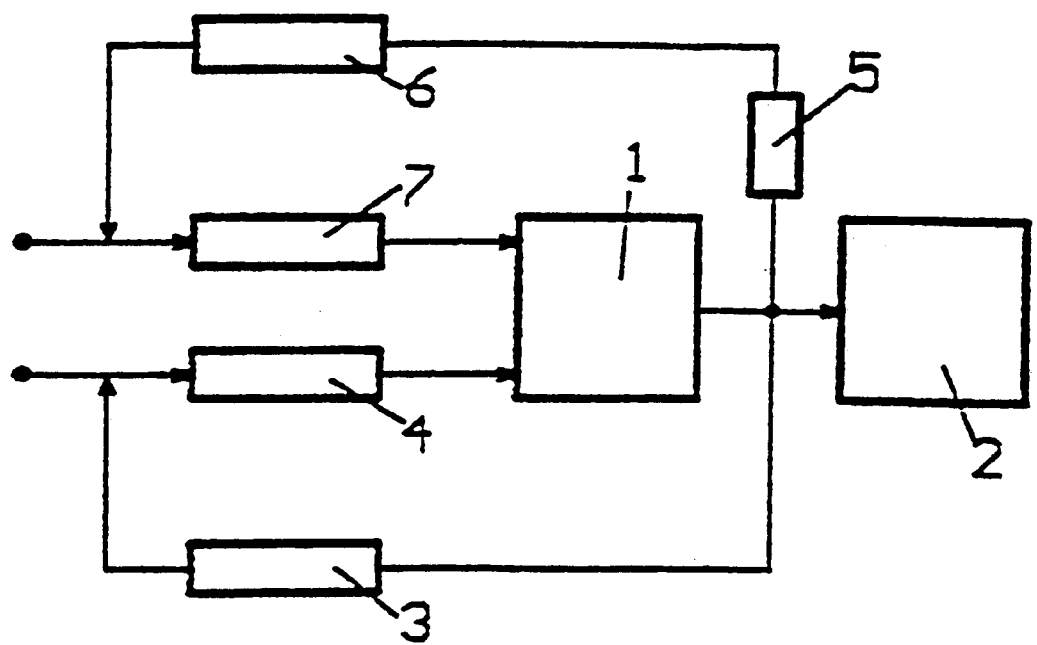

The electronic control system makes it possible to correct any erroneous behavior of the mechanical controller, which is an otherwise good way to control the engine with regard to its use and emissions.

It is especially advantageous if a display is provided to deliver an optical or acoustic signal, this display being activated when the electronic control unit is controlling the RPM.

This and other advantages and features of the invention are explained in more detail below with the help of a single FIGURE. What is shown is FIG. 1 a schematic of a power-generating system according to the invention.

In a power-generating system according to the invention to produce a voltage of prescribed level and frequency, an internal combustion engine 1 is coupled mechanically to a generator 2 in a known fashion.

To regulate the RPM of the engine, a likewise known mechanical controller 3 is provided that influences the position of a throttle plate 4 in the carburetor of the engine 1. Suitable as the mechanical controller 3 are, for example, a wind vane, anemometer-type controller, a static plate, baffle plate controller or ball controller.

By means of the mechanical controller 3, it is possible to hold the engine RPM continuously in a prescribe RPM range, which leads to the desired voltage with the prescribed frequency due to a predefined design of the generator 2.

However, the mechanical controller 3 is sensitive to mechanical and corrosive influences. Thus, for example, broken springs, bent control rods or seized bearings in the mechanics of the controller 3 can hinder the RPM control function in such a way that the engine RPM increases or lowers in an undesired manner. In particular, the increase of the engine RPM leads to an increase in the output voltage for asynchronous or synchronous machines used as the generator 2, which can result in a disruption of a user connected to the generator 2, not shown.

For this reason, an RPM-determining device 5 is provided, according to the invention, which determines the RPM of the engine or generator shaft and conveys this information to an electronic control system 6. Suitable as RPM-determining devices 5 are common parts that, for example, determine the engine RPM through mechanical or optical means.

The electronic control system 6 tests whether the engine RPM is inside or outside of a prescribed operating range, which can be saved in the electronic control system 6, for example. As long as the RPM is within the operating range, the electronic control unit 6 remains inactive. Otherwise, it directly influences an ignition unit 7 of the engine 1. By changing or deleting ignition times, it is possible for the control system 6 to thus influence the engine RPM independent of the mechanical controller 3. In the process, in particular, the rotation of the engine 1 is prevented from going too fast such that the user connected to the generator 2 is effectively protected against over-voltage or a voltage with too high of a frequency.

Of course, the RPM influence can be accomplished by the electronic controller 6 in other ways in other embodiments of the invention.

The electronic controller 6 and the RPM-determining unit 3 can be added in a simple manner to pre-existing power-generating systems without having to change the technical concept of the systems. In the process, the electronic controller 6 can be constructed in a manner that is commonly known to the expert.

In particular, complicated and expensive control systems in the generator portion, for example to influence the magnetic excitation, can be prevented.

Preferably, an acoustic or optic display is provided that is turned on by the electronic controller 6 and indicates that the electronic controller 6 is active, which is equivalent to mean that the engine RPM was determined to be outside of the prescribed range due to a disruption in the mechanical controller 3.

In the electronic controller 6, a timing circuit can also be provided which allows the electronic controller 6 to engage only after a certain time has elapsed after the determination that the RPM has gone too high.

I claim:

1. A power-generating system comprising:
   a. an internal combustion engine;
   b. an electric generator that is driven by the internal combustion engine;
   c. a mechanical control unit that is configured to control a RPM of the internal combustion engine;
   d. a RPM-determining unit that is configured to determine the RPM of the internal combustion engine; and
   e. an electronic control unit that is coupled to the RPM-determining unit and that is configured to control the RPM of the internal combustion engine, wherein the electronic control unit only controls the RPM of the internal combustion engine, thus overriding operation of the mechanical control unit, when the RPM-determining unit determines that the internal combustion engine's RPM outside of a prescribed operating range.

2. A power-generating system according to claim 1, wherein the electronic control unit controls a control unit of the internal combustion engine.

3. A power-generating system according to claim 1, wherein a display delivers an optical or acoustic signal if the electronic control unit is controlling the RPM.

4. A power-generating system according to claim 2, further comprising a display that provides an optical or acoustic indication that the electronic control unit is controlling the internal combustion engine's RPM.

5. A power-generating system according to claim 1, further comprising a timing circuit that allows the electronic controller to engage only after a prescribed time has elapsed after the RPM-determining unit detects an internal combustion engine RPM above the prescribed operating range.

6. A power-generating system according to claim 1, wherein the mechanical controller comprises at least one of a wind vane, an anemometer-type controller, a static plate controller, a baffle plate controller, and a ball controller.

7. A power-generating system according to claim 2, wherein the control unit of the internal combustion engine comprises an ignition unit.

8. A power-generating system comprising:
   a. an internal combustion engine;
   b. an electric generator that is driven by the internal combustion engine to generate electric power;
   c. a mechanical control unit that is configured to control a rotational velocity of the internal combustion engine;
   d. a rotational velocity sensor that is configured to determine the rotational velocity of the internal combustion engine; and
   e. an electronic control unit that is coupled to the rotational velocity sensor and to the internal combustion engine, wherein the electronic control unit is operable, when the internal combustion engines rotational velocity as detected by the rotational velocity sensor is outside of a prescribed operating range, to override operation of the mechanical control unit and control the rotational velocity of the internal combustion engine.

9. A power-generating system according to claim 8, wherein the electronic control unit controls a control unit of the internal combustion engine.

10. A power-generating system according to claim 8, further comprising a display that delivers an optical or acoustic signal if the electronic control unit is controlling the rotational velocity of the internal combustion engine.

11. A power-generating system according to claim 9, further comprising a display that provides an optical or acoustic indication that the electronic control unit is controlling the rotational velocity of the internal combustion engine.

12. A power-generating system according to claim 8, further comprising a timing circuit that allows the electronic controller to engage only after a prescribed time has elapsed after the internal combustion engines rotational velocity is detected as being above the prescribed operating range.

13. A power-generating system according to claim 8, wherein the mechanical controller comprises at least one of a wind vane, an anemometer-type controller, a static plate controller, a baffle plate controller, and a ball controller.

14. A power-generating system according to claim 2, wherein the control unit of the internal combustion engine comprises an ignition control unit.

* * * * *